(12) United States Patent
Ran

(10) Patent No.: US 7,747,706 B2
(45) Date of Patent: Jun. 29, 2010

(54) SYSTEM AND METHODS FOR COMPLETION OF ATTEMPTS TO ACCESS CONTENT

(75) Inventor: Uri Ran, Modi'in (IL)

(73) Assignee: Comverse Ltd., Tel Aviv (IL)

( * ) Notice: Subject to any disclaimer, the term of this patent is extended or adjusted under 35 U.S.C. 154(b) by 378 days.

(21) Appl. No.: 11/830,388

(22) Filed: Jul. 30, 2007

(65) Prior Publication Data

US 2009/0037559 A1 Feb. 5, 2009

(51) Int. Cl.
*G06F 13/00* (2006.01)

(52) U.S. Cl. .................. 709/219; 709/224; 709/227

(58) Field of Classification Search ............ 709/217, 709/219, 223, 224, 227, 229, 230, 232, 250
See application file for complete search history.

(56) References Cited

U.S. PATENT DOCUMENTS

| | | | |
|---|---|---|---|
| 6,091,962 A | 7/2000 | Bonta | |
| 6,249,681 B1 | 6/2001 | Virtanen | |
| 6,401,239 B1 * | 6/2002 | Miron | 707/203 |
| 6,501,956 B1 | 12/2002 | Weeren et al. | |
| 6,741,980 B1 | 5/2004 | Langseth et al. | |
| 6,754,470 B2 | 6/2004 | Hendrickson et al. | |
| 6,865,592 B1 * | 3/2005 | Shindo | 709/203 |
| 6,990,534 B2 | 1/2006 | Mikhailov et al. | |
| 7,076,273 B2 | 7/2006 | Laumen et al. | |
| 7,092,370 B2 | 8/2006 | Jiang et al. | |
| 7,149,541 B2 | 12/2006 | Rautila | |
| 2003/0187955 A1 | 10/2003 | Koch | |
| 2005/0069109 A1 | 3/2005 | Elias et al. | |
| 2005/0172154 A1 | 8/2005 | Short et al. | |
| 2005/0233749 A1 | 10/2005 | Karaoguz et al. | |
| 2006/0035713 A1 * | 2/2006 | Cockerille et al. | 463/42 |
| 2006/0206610 A1 | 9/2006 | Ling et al. | |
| 2006/0222152 A1 | 10/2006 | Elias et al. | |
| 2006/0276196 A1 | 12/2006 | Jiang et al. | |

FOREIGN PATENT DOCUMENTS

WO WO 2004/034193 A2 4/2004
WO WO 2005/015804 A2 2/2005

* cited by examiner

*Primary Examiner*—Viet Vu
(74) *Attorney, Agent, or Firm*—Ohlandt, Greeley, Ruggiero & Perle, L.L.P

(57) ABSTRACT

A content consumption session completion system and method useful in conjunction therewith, the system comprising an apparatus for detecting uncompleted content consumption sessions by monitoring consumption of data services by a user and logging information regarding at least one uncompleted content consumption session between at least one user and at least one data service. The system further includes an apparatus for diagnosing a reason why at least one individual content consumption session was uncompleted, and also includes an apparatus for responding to at least one uncompleted content consumption session as a function of the reason.

20 Claims, 7 Drawing Sheets

| Parameter | User A | User B | User C |
|---|---|---|---|
| Provision to the service | Yes | Yes | No |
| Handset type | Nokia 6600 | Motorola K3 | Null |
| Network type | 2.5G | 3G | Null |
| Completion preference | By notification | By auto completion | Null |
| Completion time out | 10 minutes | 90 minutes | Null |
| Active download processes | Process #324 Process #2376 | Process #1236 | Null |
| Active download processes status | Process #324: OK Process #2376: coverage loss | Process #1236: OK | |
| History of missed sessions | <list> | <list> | |

FIG. 3

| Data Service type | Reason for unsuccessful completion | DSC flow and resolution |
|---|---|---|
| Content download (song, game, file) | - Server unavailability (down) | - Monitor server availability, inform user when it is up e.g. using a ping server |
| | - Server overload (slow download) | - Monitor QOS, inform user when QOS improves to required level (e.g. monitor network load, analyze bottleneck) |
| | - Communication cut off (handset goes out of coverage) | - Monitor handset availability, inform user when the service can be renewed. (e.g. monitor handset availability and coverage of the required service |
| Access information service (news, stock page, sport) | - Server unavailability (down) | - Monitor server availability, inform user when it is up e.g. using a ping server |
| | - Server overload (slow download) | - Monitor QOS, inform user when QOS improves to required level (e.g. monitor network load, analyze bottleneck) |
| | - Communication cut off (handset goes out of coverage) | - Monitor handset availability, inform user when the service can be renewed. (e.g. monitor handset availability and coverage of the required service |
| Video call | - No coverage for video call | - Monitor when the handset is in a video coverage area, and inform the user that video call can be done |
| IP TV | - No coverage for IP TV | - Monitor when the handset is in a IP TV coverage area, and inform the user that IP TV can be consumed |

FIG. 4

| # | Examples of Steps | Examples of Scenarios |
|---|---|---|
| 1. | Marvin wants to download a new ring tone. | |
| 2. | Marvin books new ring tone download | a. Sending SMS with code to a given number<br>b. Browsing WAP and selecting the new ring tone for download |
| 3. | Download begins | |
| 4. | Download stops before completion | Manually control the following<br>a. Server down<br>b. Marvin's handset goes out of coverage |
| 5. | System books missed-completion event | A background process may be shown on a screen |
| 6. | System sends SMS to Marvin | "Download was not completed. Press 1 to be notified when download can be resumed, press 2 for auto resume" |
| 7. | Marvin books service | Notification and/or auto-resume |
| 8. | Manual attempts to locate the ring tone and re-download fail | Browsing WAP, reaching unavailable ring tone download page |
| 9. | Condition for completion met | Manually control the following<br>a. Server up<br>b. Marvin's hand set goes into coverage |
| 10. | Content download proceed | Scenarios may include:<br>a. (if notification was booked): Sending an SMS to Marvin's hand set, and resume completion after Marvin books the completion<br>b. (if auto completion was booked): resume completion automatically. Notifying Marvin when download is completed (natively by handset feature) |
| 11. | Content download completed successfully | |

FIG.6

| # | Examples of Steps | Examples of Scenarios |
|---|---|---|
| 1 | Marvin wants to view a soccer game via IP TV program menu. | Marvin connects to the WAP, navigates to the TV menu, books soccer game to view |
| 3 | IP TV soccer show begins | |
| 4 | IP TV stops during the show | Manually control the following<br>a. Server down<br>b. Marvin's handset goes out of coverage |
| 5 | System books missed-completion event | A background process may be shown on a screen |
| 6 | Content Completion sends SMS to Marvin | "Your program is temporarily unavailable. Press 1 to be notified when it can be resumed, press 2 for auto resume" |
| 7 | Marvin books service | notification and/or auto resume |
| 8 | Manual attempts to resume fail | Browsing WAP, reaching to unavailable IP TV program menu page |
| 9 | Condition to resume viewing IP TV program met | Manually control the following<br>c. Server up<br>d. Marvin's handset goes into coverage |
| 10 | IP TV show continues | Scenarios may include:<br>c. (if notification was booked): Sending an SMS to Marvin's handset, and resume completion after Marvin books the completion<br>d. (if auto completion was booked): resume completion automatically. Notifying Marvin when download is completed (natively by handset feature) |

FIG. 7

SYSTEM AND METHODS FOR COMPLETION OF ATTEMPTS TO ACCESS CONTENT

FIELD OF THE INVENTION

The present invention relates generally to management of content consumption sessions and more particularly to management of content consumption sessions carried out via a mobile communication device.

BACKGROUND OF THE INVENTION

Voice call completion functionalities are known for voice calls. For example, Comverse's "Notify Me" functionality is booked when a called party is unreachable or busy. In this case, the functionality monitors the called party's availability, and sends a notification to the caller once the called party becomes available and can be reached.

Mobile communication devices are used to provide voice call functionality, in which it is desired to converse with a person, and to provide mobile data services, also termed herein content access, in which it is desired to obtain content from a digital content source.

Mobile data services still suffer from usability problems. If an end user downloads content or data to his mobile device, and for some reason the data/content transfer is interrupted, the user receives a failure notice. There may be several causes for such failure, such as server unavailability, server overload and communication cut off, but the end user does not normally know what the problem was and when it may have recovered. If the user is interested in downloading the file—he must re-connect to the service manually, one or more times, without knowing if the file can or cannot now be downloaded.

The state of the art as described above is believed to be represented by the following patent documents inter alia: U.S. Pat. No. 6,091,962 to Bonta; U.S. Pat. No. 6,249,681 to Virtanen; U.S. Pat. No. 6,501,956 to Weeren, U.S. Pat. No. 6,741,980 to Langseth; U.S. Pat. No. 6,754,470 to Hendrickson; U.S. Pat. No. 6,990,534 to Mikhailov; U.S. Pat. No. 7,076,273 to Laumen; U.S. Pat. No. 7,092,370 to Jiang; and U.S. Pat. No. 7,149,541 to Rautilla; Published United States Application Nos. 2003/0187955 to Koch, 2005/0069109 to Elias; 2005/0172154 to Short; 2005/0233749 to Karaoguz; 2006/0206610 to Ling; 2006/0222152 to Elias; and 2006/0276196 to Jiang; and Published PCT Applications WO 2004/034193 to Haller and WO 2005/015804 to Cai.

The disclosures of all publications and patent documents mentioned in the specification, and of the publications and patent documents cited therein directly or indirectly, are hereby incorporated by reference.

SUMMARY OF THE INVENTION

In the world of voice, call completion services are known. These aim to provide would-be callers with information pertaining to missed calls, hence helping them establish communication. It is generally accepted that a large proportion, perhaps 30%, of calls are not completed. However, using various call completion services (for a called party or for a calling party) this rate may be effectively reduced to a significant extent. This is important to increase an end users' satisfaction.

In contrast, while it is known that a certain percentage of content consumption sessions are not completed, the equivalent of a call completion service is not normally provided. Content consumption sessions, such as but not limited to content download and video telephony, are not completed, e.g. because a server is down, because there is no coverage for the service, or simply due to disconnection.

It is an objective of certain embodiments of the present invention to effectively convert unsuccessful consumption of content services into a successful experience. It is another objective of certain embodiments of the present invention to increase overall usage of data services, by improving end users' experience when a service cannot be consumed. It is another objective of certain embodiments of the present invention to deploy additional data services. Still another objective of certain embodiments of the present invention is to increase the usage of a specific data service by enhancing the attractiveness of the data service itself and/or the service availability and ease of use (usability). Yet another objective of certain embodiments of the present invention is to increase the rate of successful use of data services, by monitoring unsuccessful instances and, e.g., offering the end user the option to automatically be notified when the data service can be consumed, or by automatically resuming connection with the data service on behalf of the user.

According to certain embodiments of the present invention, a content completion system is provided which is operative to perform at least one of the following functionalities:

a. Monitor consumption of data services by end users to identify unsuccessful instances of data service consumption (such as file download, server unavailability, out of coverage)

b. The system analyzes the reason for unsuccessful service consumption (may it be Quality of Service ("QOS"), out of coverage, server down etc.), and actively notifies the end user once this service can be consumed.

c. Pro-actively offer end users the option to be automatically notified when the data service is available or to automatically resume the service.

Advantages of some of the embodiments shown and described herein may include:

a. For the end user, pro-active notification of availability of the service the end-user was looking for. The end user need not bother retrying to get the service.

b. Increase in the rate of successful data service consumption, c. Higher level of user experience and trust in data service availability.

d. Less fruitless retries, by end-users, to consume a service which is not available, resulting in a reduction in overall network traffic.

Certain embodiments of the present invention seek to provide automatic identification of uncompleted content consumption, monitoring of the effective availability of the content source to the relevant end-user, and provision of notification to the end user when content can be successfully consumed and/or or automatic resumption of download.

There is thus provided, in accordance with a preferred embodiment of the present invention, a content consumption session completion system comprising apparatus for detecting uncompleted content consumption sessions by monitoring consumption of data services by users and logging information regarding at least one uncompleted content consumption session between at least one user and at least one data service, apparatus for diagnosing a reason why at least one individual content consumption session was uncompleted, and apparatus for responding to at least one uncompleted content consumption session as a function of the reason.

Further in accordance with a preferred embodiment of the present invention, the system also comprises a content consumption session completion user preference database storing at least one user preference characterizing at least one individual user and characterizing the individual user's preferences for uncompleted content consumption sessions.

Still further in accordance with a preferred embodiment of the present invention, the apparatus for responding comprises apparatus for monitoring at least one situation variable to determine when a reason diagnosed by the apparatus for diagnosing is no longer pertinent.

Additionally in accordance with a preferred embodiment of the present invention, the system also comprises content consumption session reinstating apparatus, triggered by the apparatus for monitoring, for reinstating at least one uncompleted content consumption session whose reason for having been left uncompleted is no longer pertinent.

Further in accordance with a preferred embodiment of the present invention, the system also comprises message apparatus, triggered by the apparatus for monitoring, for generating and transmitting to at least one user, at least one notification that an uncompleted content consumption session of the user's, whose reason for having been left uncompleted is no longer pertinent, can now be completed.

Still further in accordance with a preferred embodiment of the present invention, the apparatus for diagnosing is operative to diagnose at least one of the following types of reasons: server down, server unavailable, no coverage for a data service, disconnection, inadequate QOS, slowness of service.

Further in accordance with a preferred embodiment of the present invention, at least one user preference comprises at least one QOS preference defining the individual user's preferences vis a vis quality of service of content consumption sessions.

Still further in accordance with a preferred embodiment of the present invention, the uncompleted content consumption session includes at least one content downloading session.

Further in accordance with a preferred embodiment of the present invention, the content downloading session comprises at least one of the following types of session: a song downloading session, a game downloading session, and an alpha-numeric data file downloading session.

Further in accordance with a preferred embodiment of the present invention, the notification comprises an SMS message.

Still further in accordance with a preferred embodiment of the present invention, the apparatus for responding comprises prompting apparatus for prompting the user to indicate whether she/he would prefer to have the uncompleted data downloading session automatically continued when possible or to receive notification that the uncompleted data downloading session can now be continued if desired.

Further in accordance with a preferred embodiment of the present invention, the user is notified that the uncompleted content consumption session can be completed upon receipt of confirmation from the user and wherein the apparatus for responding comprises content consumption session reinstating apparatus, triggered by the confirmation from the user, for reinstating the uncompleted content consumption session whose reason for having been left uncompleted is no longer pertinent.

Still further in accordance with a preferred embodiment of the present invention, confirmation from the user comprises one-click confirmation.

Further in accordance with a preferred embodiment of the present invention, the apparatus for detecting comprises a content consumption session progress monitor for detecting and storing ongoing characteristics of a content consumption session at a point at which it was cut off and wherein the content consumption session reinstating apparatus is operative to reinstate at least one of the ongoing characteristics of the uncompleted content consumption session.

Still further in accordance with a preferred embodiment of the present invention, the ongoing characteristic at a point at which the content consumption session was cut off comprises a webpage which the user had had open when the content consumption session was cut off.

Further in accordance with a preferred embodiment of the present invention, the apparatus for detecting uncompleted content consumption sessions comprises an intentional session end detector operative to detect and disregard at least one content consumption session which was intentionally discontinued by a user.

Also provided, in accordance with another preferred embodiment of the present invention, is a content consumption session completion method comprising detecting uncompleted content consumption sessions by monitoring consumption of data services by users and logging information regarding at least one uncompleted content consumption session between at least one user and at least one data service, diagnosing a reason why at least one individual content consumption session was uncompleted; and responding to at least one uncompleted content consumption session as a function of the reason.

Further in accordance with a preferred embodiment of the present invention, the uncompleted content consumption session comprises a video telephone session.

Still further in accordance with a preferred embodiment of the present invention, the uncompleted content consumption session comprises an on-line information service accessing session.

Further in accordance with a preferred embodiment of the present invention, the uncompleted content consumption session comprises an Internet Protocol ("IP") TV session.

The term "content completion" as used herein refers to any type of typically pro-active augmentation of an unsuccessful attempt to obtain content, e.g. via a mobile telephone. Obtaining content includes but is not limited to any of the following operations: downloading content, video telephony, accessing of information services and IP TV. Augmentation may include but is not necessarily limited to any of the following steps: typically pro-active notification of a time to retry, typically pro-active automatic retrying and resuming, and collecting information including user preferences to shape, typically by parameterization, the notification and/or automatic retrying processes. The term "content" is intended to include any data or information, whether alphanumeric, audio, visual, other, or any combination of the above, including but not limited to infotainment and entertainment-type content, which the user wants to access, other than actual on-line voice calls. The term "access" is intended to include any type of interface allowing the content to reach the user, such as but not limited to on-line access and downloading.

Any suitable processor, display and input means may be used to process, display and accept information as described herein, such as but not limited to a conventional mobile communication device, personal computer processor; display screen and/or printer; and keyboard/mouse.

Devices practicing the invention shown and described herein may communicate with one another via any conventional wired or wireless digital communication means, e.g. via a telephone network or a computer network such as the Internet.

Acronyms used herein include:
AuC: Authentication
CCS-GW: Call completion service gateway CSC: Call State Control
CS-MGW: Call Server/Circuit Switching Media Gateway
DSC: Digital Security Control
GGSN: Gateway GPRS Service Node
GMSC: Gateway Mobile Switching Centre
GPRS: General Packet Radio Service, a standard for wireless communications
HLR: Home Location Register
IM MDG: Instant Messaging Media Gateway
IP/ATM: Internet Protocol/Asynchronous Transfer Mode
IP TV: Internet protocol television
MGCF: Media Gateway Control Function
MRF: Media Resource Function
MSC server: Mobile Switch Center's server
PSTN: Public service telephone network
SGSN: Serving GPRS Service Node
SS7: Signaling System number 7
QOS: Quality of service
RTP: Real-Time Transport Protocol, for formatting packets of multimedia content.
RTSP: Real Time Streaming Protocol, a standard for controlling streaming data over the World Wide Web, e.g. for broadcasting audio-visual data to large groups
TCP traffic: Transmission Traffic Protocol
VLR: Visitor Location Register
WEP: Wireless Encryption Protocol, used for privacy
2G MS: Second generation mobile communication system
2G+ MS: 2+ generation mobile communication system
3G: third generation
3G UE: 3G User Equipment

BRIEF DESCRIPTION OF THE DRAWINGS

Preferred embodiments of the present invention are illustrated in the following drawings:

FIG. 3 is a simplified tabular representation of a preferred data structure for the uncompleted content access session database of FIG. 1;

FIG. 4 is a table summarizing possible variations on the system of FIG. 1, for different types of data services;

FIG. 6 is a table illustrating an example of an improved content access session, in which content such as a ring tone is downloaded, which may be achieved using the apparatus and methods of FIGS. 1-5; and FIG. 7 is a table illustrating another example of an improved content access session, in which IP TV is viewed, which may be achieved using the apparatus and methods of FIGS. 1-5.

DETAILED DESCRIPTION OF PREFERRED EMBODIMENTS

Figure 1:
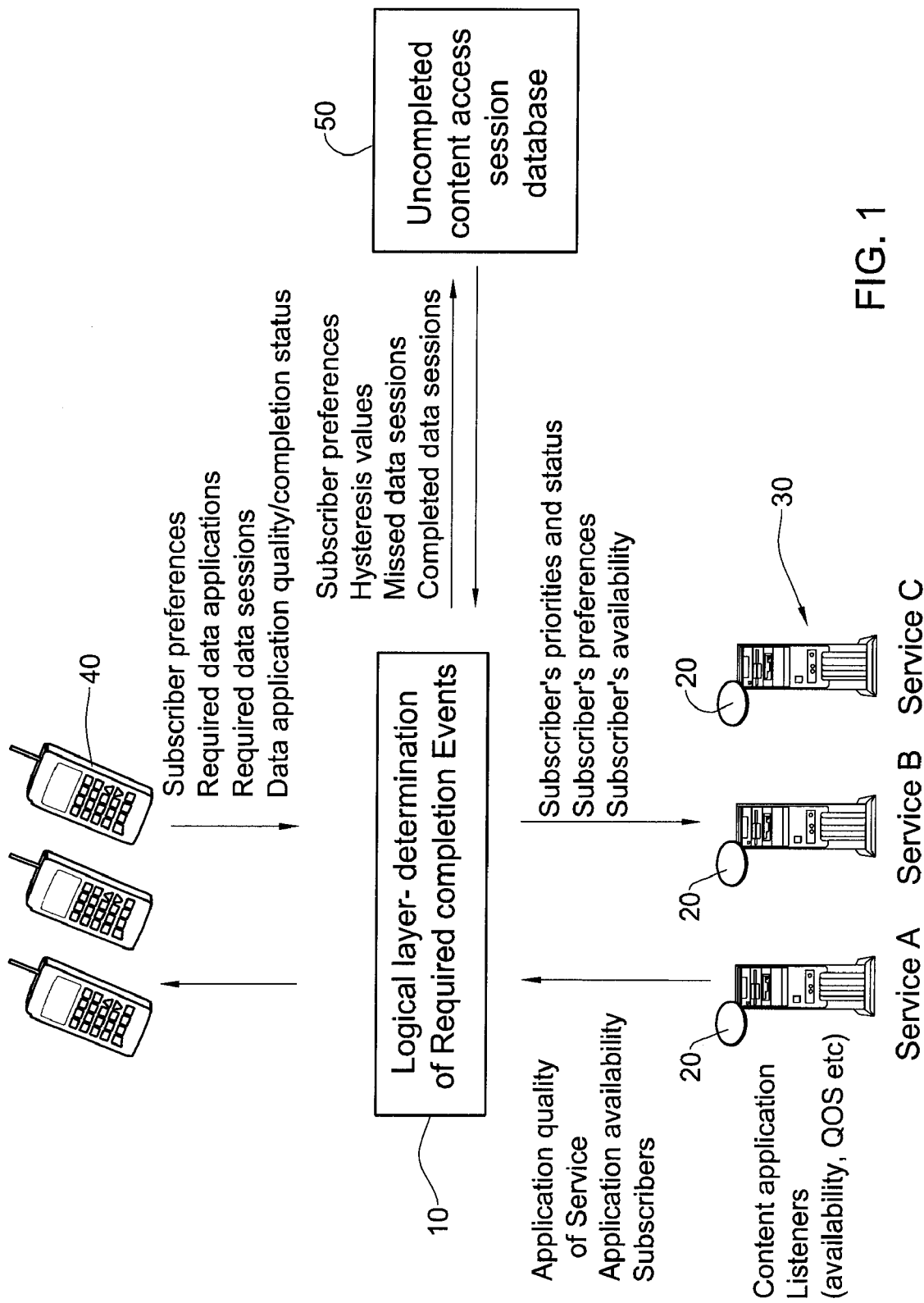
FIG. 1 is a simplified semi-block diagram semi-pictorial illustration of a content access completion system constructed and operative in accordance with a preferred embodiment of the present invention.

Reference is now made to FIG. 1 which is a simplified semi-block diagram semi-pictorial illustration of a content access completion system constructed and operative in accordance with a preferred embodiment of the present invention. The system of FIG. 1 typically includes a logical layer 10 for determining RCEs (required completion events) and a content application availability layer 20, operative to augment content access attempts made to content providing servers 30 by mobile devices 40. An uncompleted content access session database 50 stores data pertaining to uncompleted content access sessions for the benefit of logical layer 10. Any or all of the information associated with the data flow arrows in FIG. 1 may flow between the relevant elements of FIG. 1.

Logic layer 10 typically performs some or all of the following functionalities:

(a) Defining end user preferences, defaults and/or thresholds (per user/per network) for completion services. For example, what would be the threshold QOS starting from which completion for a file download is to be offered if the initial download has been aborted?

(b) Determination of Required Completion Events (RCE) typically including booking suitable information each time that: (i) a Subscriber (ii) who is provisioned to the Data Completion Service (iii) is detected trying to consume a data service (iv) which is being monitored by the system of FIG. 1 and (v) the data consumption session was not completed. RCE determination may include aggregating information pertaining to any or all of the following: initiation of content service consumption, content service availability, QOS, and end user network coverage; and correlating the above information with end user preferences. For example, the end user may have booked a download of a file. His preference for completion may be either notification or automatic download. His preference for download may be at either high, medium, or low QOS. A content completion functionality in the logical layer 10 analyzes service availability and correlates it with the end user's preferences.

(c) Determination of conditions for Service Completion to the end user by aggregating information that is relevant to the specific service and incompletion event such as but not limited to any or all of the following: content service availability, QOS, and end user network coverage, and correlating the above information with end user preferences.

Sessions may be completed, when conditions allow, by notification, e.g. by sending an SMS message via an SMSC, or by completion, typically by sending a suitable command to the download server, IPTV server, or other content providing system 30.

The content application availability layer 20 typically performs some or all of the following functionalities:

(a) Monitoring the availability and preferably QOS of each specific content application service. For example, a file server may be monitored both for availability and for QOS. This may be effected either remotely or by deploying a sensor on the application server.

Optionally, a handset sensor (not shown) is provided on each mobile communication device handset 40. The optional handset sensor monitors activities on the handset relevant to end user behavior so as to facilitate system decisions on whether and when to offer content completion to this particular user.

Database 50 is operative to store, back up and restore information relevant to uncompleted sessions and their completion, such as but not limited to network and end user preferences, Required Completion Events, historical data such as missed content completion events, information characterizing content servers, and QOS information.

Figure 2:
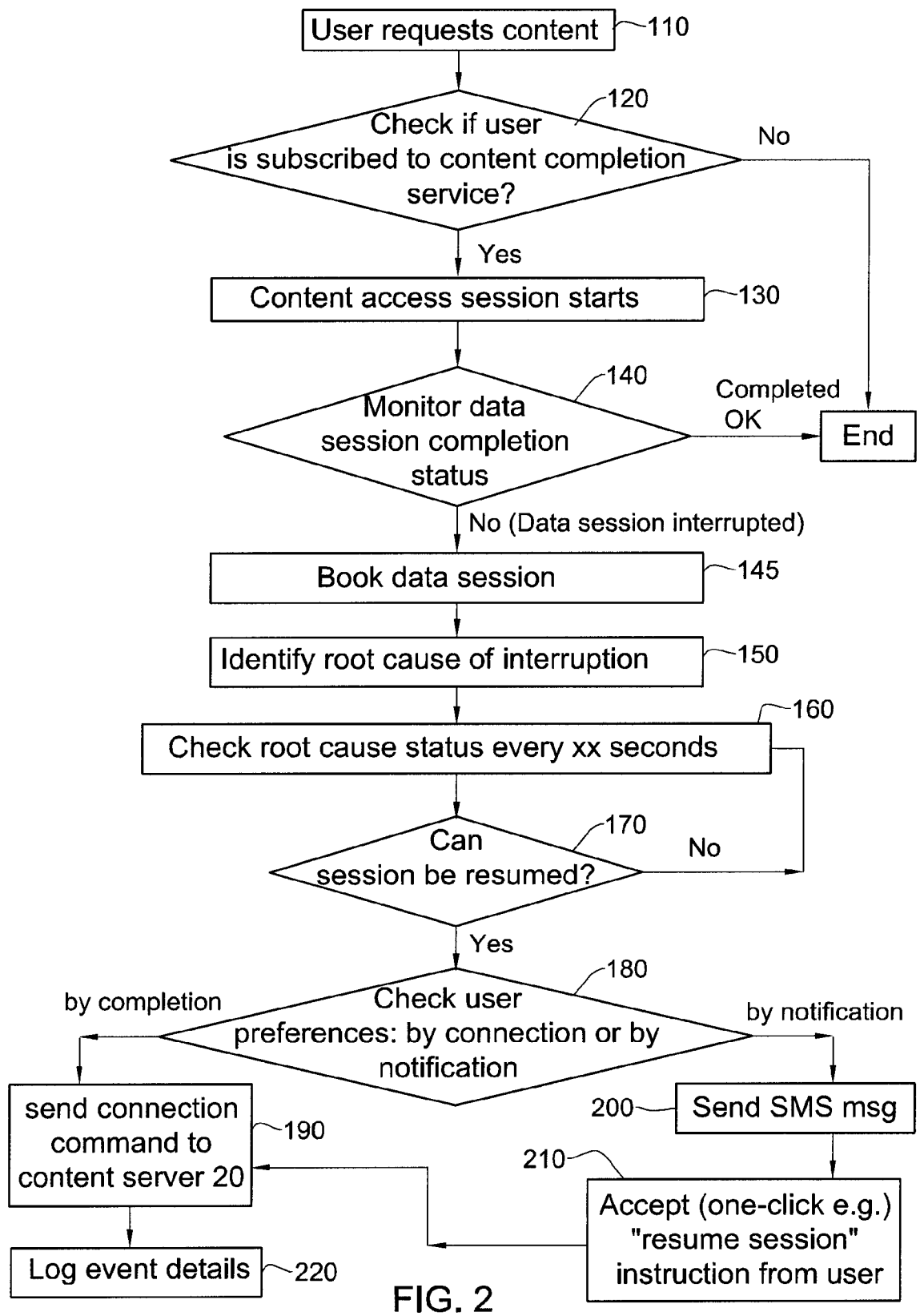
FIG. 2 is a simplified flowchart illustration of a preferred method of operation for the system of FIG. 1.

FIG. 2 is a simplified flowchart illustration of a preferred method of operation for the system of FIG. 1. As shown, content access sessions are monitored; if the session is completed the method ends. If, however, a session fails to be completed, it is "booked" i.e. deemed of interest to the system, and the cause of the failure is identified (step 150). The status of the root cause is checked periodically, e.g. every 10 seconds, until it is found that the session can be resumed. The method may then proceed to restore the session, or may proceed to notify the user and await his typically one-click confirmation before restoring the session, or may proceed selectively as a function of known or derived user preferences pertaining to restoration with or without prior notification. Another option is to simply notify the user who may then prefer to restore the session on his own.

Three examples of applications for the method of FIG. 2 are now described:

Example 1

Downloading Content Such as a Song, Game, or Other File

An end user tries to download a song or game. Because the service is too slow, or because communication is cut off (perhaps because the end user has entered an elevator), the download process stops. Step 140 identifies the uncompleted transaction. Once the end user's handset is in a coverage area, step 180 may proactively offer the end user an SMS message prompting the user to click 1 if she/he wishes to be informed when the service can be consumed again or to click 2 to automatically continue the download when the service can be consumed.

Example 2

Accessing an Information Service

The end user is traveling by train to work, and elects to browse WEP in order to read news and see stock prices. The train enters a tunnel, and communication is lost. Step 140 identifies the uncompleted service. Once the end user's handset is in a coverage area, step 180 may proactively offer the end user an SMS message prompting the user to click 1 if she/he wishes to be informed when the service can be consumed again or to click 2 to automatically continue the download when the service can be consumed. The end user elects to be notified. Once the information service can be consumed, the end user is notified (step 200) and elects to get the service with a single click. Step 190 then directs the handset's WEP directly to the page visited when the cut off occurred.

Example 3

Viewing an IP TV Show

The end user browses through a list of IP TV shows, and decides to view the Tonight Show. Unfortunately, when the show begins, the handset is out of IP TV coverage. Step 140 identifies the uncompleted service and proactively prompts the end user, e.g. by SMS, to click 1 to be informed when the IP TV service can be consumed or to click 2 to automatically switch to IP TV when possible. The end user elects to be notified. Once the handset goes into IP TV Coverage, the end user is notified and elects to view the show. Step 190 then directs the handset directly to the Tonight Show.

FIG. 3 is a simplified tabular representation of a preferred data structure for the uncompleted content access session database of FIG. 1. Some or all of the parameters shown may be stored for each of a population of users such as the three specifically shown by way of example.

FIG. 4 is a table summarizing possible variations on the system and method of FIGS. 1-2, for different types of content consumption applications. Different applications are characterized by different root causes for failure. Therefore, the status checking step 160 and the criterion for session resumption used in step 170 both differ as a function of application as indicated in the third column (DSC flow and resolution) of the table of FIG. 4.

Figure 5:
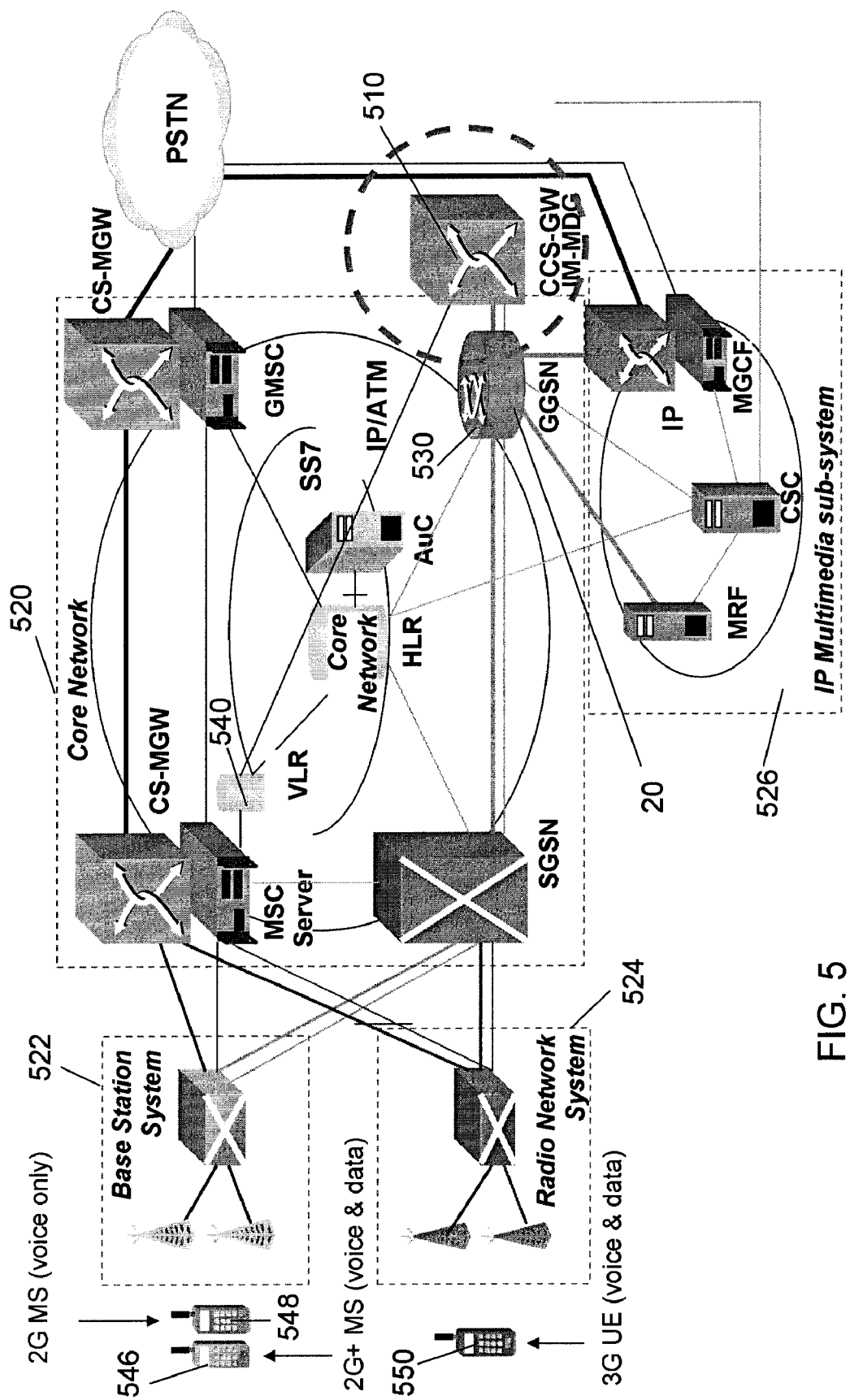
FIG. 5 is a simplified block diagram illustration of an example of an implementation of the system of FIG. 1.

Reference is now made to FIG. 5 which is a simplified block diagram illustration of an example of an implementation of the system of FIG. 1. As shown, a CCS Gateway (CCS-GW) 510 resides in an operator's core data network 520 which may interface with a base station system 522, radio network system 524, and IP multimedia subsystem 526 as shown. The gateway 510 is typically disposed behind the core network's GGSN 530, thereby to provide access to the raw IP data traffic in the network. The gateway 510 is also typically connected to a VLR 540, enabling the gateway 510 to be aware of each occurrence in which a device has lost its connection to the data network.

The following session failure root causes which characterize HTTP protocol-based content downloads of songs, games or other files, as well as HTTP protocol based Information Services, may be resolved as follows by the apparatus of FIG. 5:

Server unavailability: the gateway 510 may log all or a window of recent device actions. When the gateway 510 recognizes a server error while a device is consuming data (sending or receiving) it begins monitoring the server for availability. Once the server and service are available again, the gateway 510 notifies the user, e.g. by SMS with a link for the user's last action.

Server overload: The gateway 510 may monitor connection speed (bit rate) for each device and connection. When the bit rate falls under a certain threshold, which might be predetermined or may for example be a percentage of the last session's average rate, the connection may be disconnected. Every several minutes the gateway 510 monitors the server's performance. Once the performance is as expected, the gateway notifies the user through an SMS with a link for his last action.

Communication cut off: The gateway 510 monitors device availability through the network VLR 540. If a device becomes disconnected from the network the gateway 510 is notified through the VLR 540 and logs the last action of the disconnected device. Once the device has been reconnected, the gateway 510 is notified and it notifies the user through an SMS with a link for the user's last action. Alternatively, monitoring of TCP traffic may occur, enabling the gateway 510 to recognize that a particular device is no longer connected.

For video call applications, the gateway 510 typically monitors device availability through the network VLR 540. If a device is disconnected, either entirely or just from the 3G network 524, the gateway 510 is notified through the VLR 540 and it logs the details of the last call made by the device. If the device was disconnected from the network completely, the gateway 510 is notified of its eventual re-connection, upon which it notifies the user prompting him to reconnect the call. If the device was disconnected only from the 3G network, the gateway 510 preferably immediately prompts the user to either connect the call as voice only or to await notification that a video call is possible again.

For IP TV applications, the gateway 510 may monitor device availability through the network VLR 540. If a device becomes disconnected from the network the gateway 510 may be notified through the VLR 540 and may log the last action of the device. Once the device is reconnected the gateway 510 is notified and in turn notifies the user e.g. via SMS with a link for his last action.

Alternatively or in addition, the RTP/RTSP traffic of the media connection may be monitored, enabling the gateway 510 to recognize that a particular device is no longer connected.

FIG. 6 is a table illustrating an example of an improved content access session, in which content such as a ring tone is downloaded, which may be achieved using the apparatus and methods of FIGS. 1-5. FIG. 7 is a table illustrating another example of an improved content access session, in which IP TV is viewed, which may be achieved using the apparatus and methods of FIGS. 1-5. More generally, it is appreciated that conventionally, once content consumption is interrupted, it is not restored unless the user manually effects this. A particular advantage of certain embodiments of the invention is that automatic re-starting is provided which improves the user's experience by effectively increasing the proportion of successful content completion sessions.

According to one embodiment of the invention, the system may comprise one or more computers or other programmable devices, preferably equipped with input devices such as a keyboard and mouse operative to allow users to provide input to the system as described herein, and output devices such as a printer or interface with communication network servers such as Internet servers or with communication devices such as a cellular telephone. Each computer may be programmed in accordance with some or all of the apparatus, methods, features and functionalities shown and described herein. Alternatively or in addition, the apparatus of the present invention may comprise a memory which is readable by a machine and which contains, stores or otherwise embodies a program of instructions which, when executed by the machine, comprises an implementation of some or all of the apparatus, methods, features and functionalities shown and described herein. Alternatively or in addition, the apparatus of the present invention may comprise a computer program implementing some or all of the apparatus, methods, features and functionalities shown and described herein and being readable by a computer for performing some or all of the methods of, and/or implementing some or all of the systems of, embodiments of the invention as described herein.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

What is claimed is:

1. A content consumption session completion system comprising:
 a content consumption session completion user preference database storing at least one user preference characterizing at least one individual user and characterizing the individual user's preferences for responding to uncompleted content consumption sessions;
 an apparatus for detecting an uncompleted content consumption session by monitoring consumption of data services by at least one user and logging information regarding at least one uncompleted content consumption session between the at least one user and at least one data service;
 an apparatus for diagnosing a reason why at least one individual content consumption session was uncompleted; and
 an apparatus for responding to at least one uncompleted content consumption session as a function of the reason.

2. The system according to claim 1 wherein said apparatus for responding further comprises an apparatus for monitoring at least one situation variable to determine when a reason diagnosed by said apparatus for diagnosing is no longer pertinent.

3. The system according to claim 2 and also comprising a content consumption session reinstating apparatus, triggered by said apparatus for monitoring, for reinstating at least one uncompleted content consumption session whose reason for having been left uncompleted is no longer pertinent.

4. The system according to claim 2 and also comprising a message apparatus, triggered by said apparatus for monitoring, for generating and transmitting to at least one user at least one notification that an uncompleted content consumption session of the user whose reason for having been left uncompleted is no longer pertinent, can now be completed.

5. The system according to claim 1 wherein said apparatus for diagnosing is operative to diagnose at least one of the following types of reasons: server down, server unavailable, no cove rage for a data service, disconnection, inadequate Quality of Service ("QOS"), slowness of service.

6. The system according to claim 1 wherein said at least one user preference comprises at least one QOS preference defining the individual user's preferences vis a vis quality of service of content consumption sessions.

7. The system according to claim 1 wherein said uncompleted content consumption session includes at least one content downloading session.

8. The system according to claim 7 wherein said content downloading session comprises at least one of the following types of session:
 a song downloading session;
 a game downloading session; and
 an alpha-numeric data file downloading session.

9. The system according to claim 4 wherein said notification comprises an SMS message.

10. The system according to claim 7 wherein said apparatus for responding comprises prompting apparatus for prompting the user to indicate whether she/he would prefer to have the uncompleted data downloading session automatically continued when possible or receive notification that the uncompleted data downloading session can now be continued if desired.

11. The system according to claim 4 wherein the user is notified that the uncompleted content consumption session can be completed; and upon receipt of confirmation from the user, said apparatus for responding and said content consumption session reinstating apparatus are triggered to reinstate said uncompleted content consumption session whose reason for having been left uncompleted is no longer pertinent.

12. The system according to claim 11 wherein said confirmation from the user comprises one-click confirmation.

13. The system according to claim 3 wherein said apparatus for detecting comprises a content consumption session progress monitor for detecting and storing at least one ongoing characteristic of a content consumption session at a point at which the session was cut off and wherein said content consumption session reinstating apparatus is operative to reinstate at least one of said ongoing characteristics of said uncompleted content consumption session.

14. The system according to claim 13 wherein said at least one ongoing characteristic comprises a webpage which the user had open when the content consumption session was cut off.

15. The system according to claim 1 wherein said apparatus for detecting uncompleted content consumption sessions comprises an intentional session end detector operative to detect and disregard at least one content consumption session which was intentionally discontinued by a user.

16. The system according to claim 1 wherein said uncompleted content consumption session comprises a video telephone session.

17. The system according to claim 1 wherein said uncompleted content consumption session comprises an on-line information service accessing session.

18. The system according to claim 1 wherein said uncompleted content consumption session comprises an Internet Protocol Television ("IP TV") session.

19. The system according to claim 11 wherein said apparatus for detecting comprises a content consumption session progress monitor for detecting and storing ongoing characteristics of a content consumption session at a point at which it was cut off and wherein said content consumption session reinstating apparatus is operative to reinstate at least one of said ongoing characteristics of said uncompleted content consumption session.

20. A content consumption session completion method comprising:
   storing at least one user preference characterizing at least one individual user and characterizing the individual user's preferences for responding to uncompleted content consumption sessions;
   detecting uncompleted content consumption sessions by monitoring consumption of data services by users and logging information regarding at least one uncompleted content consumption session between at least one user and at least one data service;
   diagnosing a reason why at least one individual content consumption session was uncompleted; and
   responding to at least one uncompleted content consumption session as a function of the reason.

* * * * *